US009639359B2

(12) United States Patent
Xie et al.

(10) Patent No.: US 9,639,359 B2
(45) Date of Patent: May 2, 2017

(54) THERMAL-AWARE COMPILER FOR PARALLEL INSTRUCTION EXECUTION IN PROCESSORS

(71) Applicant: Advanced Micro Devices, Inc., Sunnyvale, CA (US)

(72) Inventors: Yuan Xie, State College, PA (US); Junli Gu, Beijing (CN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/976,905

(22) PCT Filed: May 21, 2013

(86) PCT No.: PCT/CN2013/075978
§ 371 (c)(1),
(2) Date: Jun. 27, 2013

(87) PCT Pub. No.: WO2014/186948
PCT Pub. Date: Nov. 27, 2014

(65) Prior Publication Data
US 2016/0098275 A1    Apr. 7, 2016

(51) Int. Cl.
*G06F 9/45* (2006.01)
*G06F 9/30* (2006.01)
*G06F 9/48* (2006.01)

(52) U.S. Cl.
CPC ........ *G06F 9/30083* (2013.01); *G06F 8/4432* (2013.01); *G06F 9/30087* (2013.01); *G06F 9/30149* (2013.01); *G06F 9/4893* (2013.01); *Y02B 60/144* (2013.01); *Y02B 60/181* (2013.01)

(58) Field of Classification Search
None
See application file for complete search history.

(56) References Cited

U.S. PATENT DOCUMENTS

| 5,852,729 | A  | * | 12/1998 | Limberis | G06F 9/32 |
| | | | | | 704/258 |
| 5,958,044 | A  | * | 9/1999 | Brown | G06F 9/30079 |
| | | | | | 712/215 |
| 6,442,701 | B1 | * | 8/2002 | Hurd | G06F 1/3287 |
| | | | | | 712/204 |
| 7,266,708 | B2 | * | 9/2007 | Miller | G06F 1/3203 |
| | | | | | 710/59 |

OTHER PUBLICATIONS

"Temperature-Aware compilation for VLIW Processors" by Benjamin Schafer et al., Aug. 2007, pp. 1-7, [online][retrieved on Feb. 17, 2016], Retrieved from <https://www.researchgate.net/publication/221207735_Temperature-Aware_Compilation_for_VLIWProcessors>.*

* cited by examiner

*Primary Examiner* — Evral E Bodden
(74) *Attorney, Agent, or Firm* — Staniford Tomita LLP

(57) ABSTRACT

Embodiments are described for a method for compiling instruction code for execution in a processor having a number of functional units by determining a thermal constraint of the processor, and defining instruction words comprising both real instructions and one or more no operation (NOP) instructions to be executed by the functional units within a single clock cycle, wherein a number of NOP instructions executed over a number of consecutive clock cycles is configured to prevent exceeding the thermal constraint during execution of the instruction code.

18 Claims, 5 Drawing Sheets

300

400

THERMAL-AWARE COMPILER FOR PARALLEL INSTRUCTION EXECUTION IN PROCESSORS

TECHNICAL FIELD

One or more implementations relate generally to microprocessor architecture, and more specifically to a compiler that optimizes instruction scheduling for thermal constraints in processors.

BACKGROUND

Multi-core processors present significant challenges to designers due to tradeoffs between performance, power consumption, and thermal constraints. In general, cooling and packaging technology do not scale with device technology and therefore limit the power consumption of a multi-core processor. Thermal issues are especially relevant in heterogeneous system architecture (HSA) devices that use processors capable of executing multiple instructions in parallel. For example, traditional VLIW processors try to schedule as many instructions as possible to achieve instruction level parallelism (ILP) by fetching and packing multiple instructions into large instruction words that are dispatched and executed on multiple functional units in parallel. When all of the functional units of a processor core are used, the increased power consumption of the functional units can cause excessive chip temperature that violates thermal constraints and may ultimately damage or destroy the device. In some cases, device packaging or cooling mechanisms may be employed to address this problem, but obviously add to the cost, size and complexity of the device.

Problems associated with thermal constraints, such as chip overheating, increased power consumption, and decreased performance are especially problematic for mobile devices that have tight power and packaging constraints. New processing techniques, such as computational sprinting were developed to solve some of these problems, but under certain conditions may add stress during operation. Most multicore processors are at least partially idle for periods of time and then potentially entirely active for certain other periods of time as needs dictate. Computational sprinting is a technique that dynamically activates otherwise powered-down cores for short bursts of intense activity in response to conditions such as sporadic user activity. During this active time, the cores operate in parallel and the processor generates heat at a rate that can far exceed the thermal and electrical capacities of the device. Thus, sprinting is typically performed by running the processor until a thermal threshold is reached, at which time a controller then shuts down most of the cores and runs only one or a less number of cores to keep the temperature down. FIG. 1 illustrates the operation of a dynamic sprinting technique according to known methods. As shown in FIG. 1, an example processor 100 comprises eight individual functional units 104 denoted FU1-FU8. Processor 100 illustrates an example VLIW architecture that can pack up to eight instructions 102 (denoted Instruction1 to Instruction8) together and execute them simultaneously by eight functional units 104 in one processor cycle. Each functional unit 104 executes a respective instruction 102 so that at a particular time, all of the functional units are executing their respective instructions simultaneously. When the thermal threshold is reached, a lesser number of functional units (in the illustrated example all but one functional unit (e.g., FU1) is shut-down. As shown in FIG. 1, control transition 106 causes FU2-FU8 to stop executing and FU1 to continue executing instruction 1. The functional unit shut-down 106 occurs when the system senses that the thermal constraints of the device have been exceeded, at which time a defined number of cores or functional units are then simply deactivated until an acceptable thermal condition is reached. This is a run-time solution in that it occurs as the chip is executing instructions in real time, and requires an on-chip thermal sensor to provide the thermal condition signals to the controller. It is also a coarse-granularity solution in that it operates at the core-level, and shuts down a processor core (or other functional unit) completely, and leaves only one or a few cores operating per clock cycle. This present approach imposes certain hardware overhead and, while relatively effective in preventing failure due to thermal overload, it does not fully provide constant performance benefits in that cores that were activated to increase throughput are abruptly shutdown for indeterminate periods of time.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY OF EMBODIMENTS

Some embodiments are directed to addressing the thermal issues in heterogeneous system architecture (HSA) where multiple processor cores or functional units can be used in parallel. Embodiments include a thermal aware scheduling component in a compiler that optimizes packing and scheduling of instruction code with respect to thermal constraints of the device. This static time compiler-driven ensures that the processors run at the maximum possible utilization under the thermal constraints. This solution can also be used to adjust the functional units allocation dynamically according to different computing phases, and overcomes the shortcoming of traditional approaches in which, when all the functional units in a processor core are used, the power consumption of the functional unit can cause the increase of the chip temperature and may result in the violation of the thermal constraints or higher cooling package cost.

Some embodiments are directed to a method of allocating resources in a processor having a plurality of functional units by defining a relative importance of each functional unit of the plurality of functional units in different computing phases; determining a thermal constraint of the processor; defining a plurality of instruction words each containing real instructions and no operation (NOP) instructions to be simultaneously executed by the plurality of functional units during a single respective clock cycle, wherein the real instructions activate a respective functional unit; determining if a threshold limit defining the thermal constraint is reached during activation of the functional units; and de-activating certain functional units in different computing phases in order of relative importance to power consumption and/or processing power to maximize performance of the processor.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Embodiments are generally directed to a thermal aware scheduling component in a compiler that optimizes packing and scheduling of instruction code with respect to thermal constraints of a processor, and an associated processor pipeline component that activates or deactivates functional units of the device in response to the thermal optimized code.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
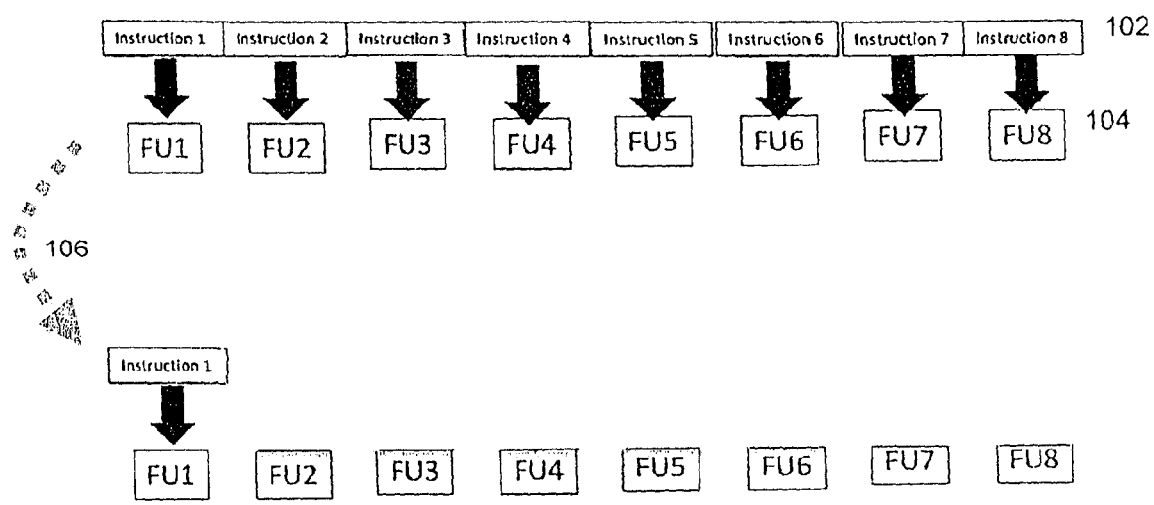
FIG. 1 illustrates the operation of a dynamic computational sprinting technique according to known methods.

As shown in FIG. 1, a traditional VLIW architecture relies on the compiler to schedule and pack multiple instructions 102 into a long-instruction-word that can maximize the instruction-level parallelism and the utilization of the functional units 104 for performance optimization while ignoring the thermal impact. The power consumption of the functional units during such parallel operation can result in excessively high temperatures for the processor. Some embodiments are directed to systems and methods to maximize the utilization of the function units under the thermal constraints through certain compiler techniques that provide thermal-aware scheduling of parallel instructions. A thermal-scheduling component within the compiler provides a static solution that configures instructions for execution by functional units in a VLIW processor core and provides significantly finer granularity of instruction scheduling than present compilers. Embodiments also include hardware control logic added to the pipeline of VLIW processor to shut down the execution logic to remove power from one or more of the functional units to reduce power consumption and heat build-up.

Figure 2:
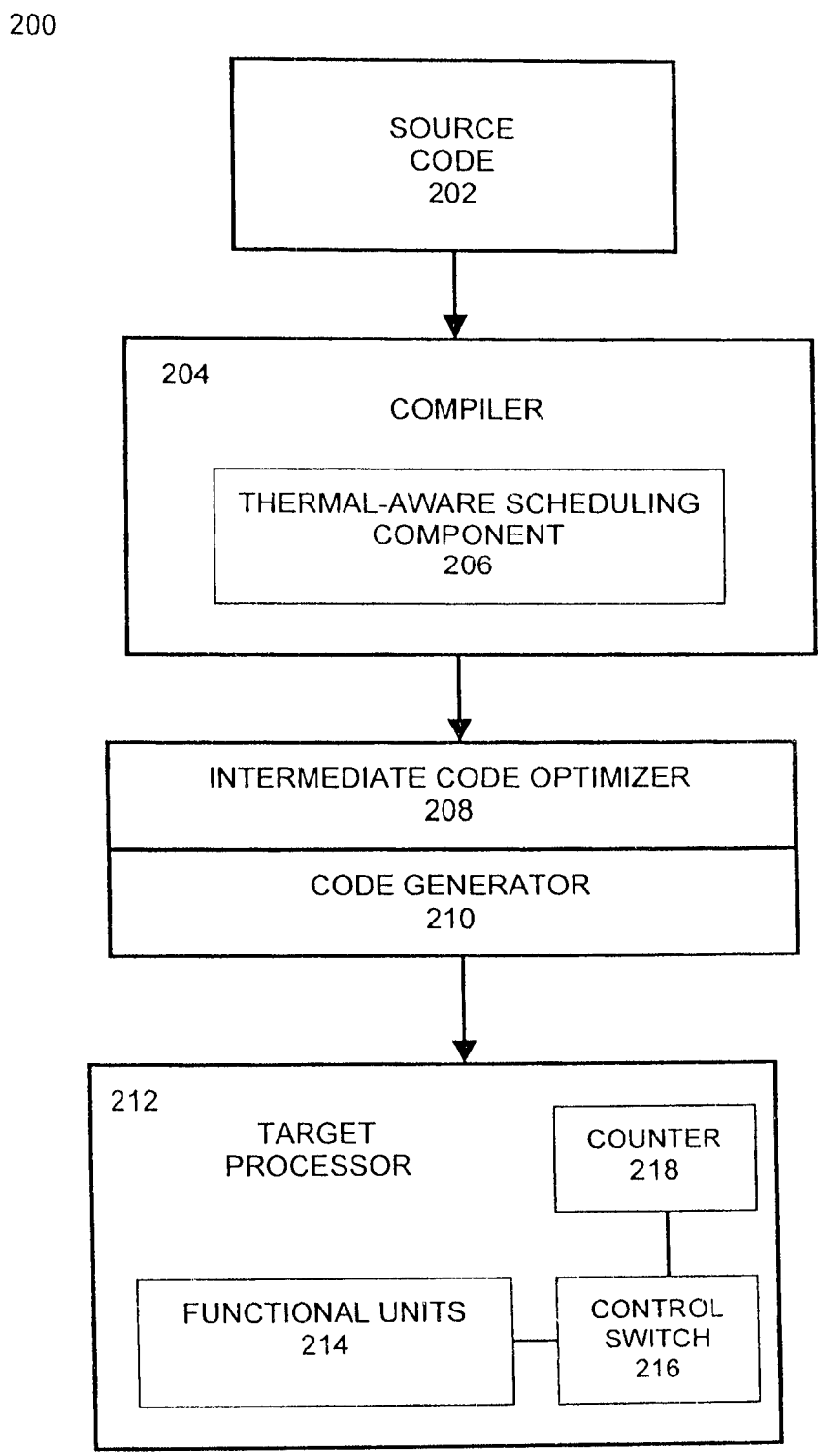
FIG. 2 illustrates a compiler system that implements a thermal-aware scheduling component, under some embodiments.

In some embodiments, a thermal-aware scheduling component is implemented within a standard compiler system to schedule instructions in a manner that reduces the power consumption of functional units within a target processor in order to keep heat generation within the thermal constraints of the device and under maximum temperature thresholds. Such scheduling may include packing the instructions into a VLIW. FIG. 2 illustrates a compiler system 200 that implements a thermal-aware scheduling component, under some embodiments. Compiler 204 is a program or set of programs that transforms source code 202 from a source language into a target language comprising object code that is executed on one or more target processors 212. Compiler 204 performs several functions to convert the source code from a high-level language to the lower level language of the object code, including lexical analysis, preprocessing, parsing, and semantic analysis, among other functions. The compiler 204 may produce non-optimized intermediate code, in which case the compile system 200 includes an intermediate code optimizer 208 that generates optimized intermediate code, and a code generator that generates the machine code to be executed on the target processor 212. The compiler may also be configured to directly generate the final optimized code. Optimization typically involves removal of invalid code, resolving constant values, load-balancing instruction execution and other efficiency enhancing tasks. As shown in FIG. 2, the target processor 212 includes several functional units 214 that are configured to execute individual instructions in parallel.

For the embodiment of FIG. 2, the compiler 204 includes a thermal-aware scheduling component 206 that intentionally schedules and packs instructions executed by the functional units 214 to reduce the power consumption of the functional units and therefore reduce the thermal impact of executing parallel instructions in the target processor 212. For the embodiment shown in FIG. 2, the thermal-aware scheduling component is illustrated as being a functional component within compiler 204. Alternatively, it may be implemented as a component within the code optimizer 208 or even the code generator 210. It may also be implemented as a distributed function that is performed by any combination of these components 204-210. The compiler 204 may be a native compiler, a hosted compiler, a cross-compiler, a hardware compiler, a one-pass or multi-pass compiler, or any appropriate compiler as known to those of ordinary skill in the art, and as appropriate for the source code 202 and target processor 212 of system 200.

As stated above, the thermal-aware scheduling component schedules individual instructions into one or more instruction words that are configured to optimize the performance versus power consumption characteristics of execution of the functional units to prevent thermal overload conditions. A control switch 216 is coupled to the functional units 214 and activates or deactivates each functional control unit in response to the instruction execution order dictated by the thermal-aware component 206. The control switch may be embodied as a single switch configured to control each of the functional units or a bank of switches, with one switch per functional unit. The control switch 216 may be implemented as a hardware control switch, a programmable function, or a combination of both.

Figure 3:
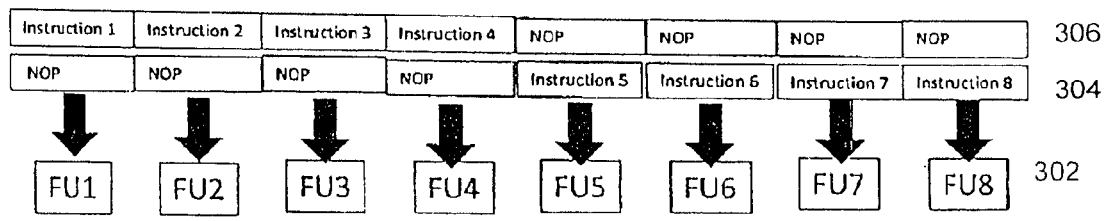
FIG. 3 illustrates the scheduling and packing of instructions by a thermal-aware compiler component into an example order, under some embodiments.

As stated above, thermal-aware component 206 schedules instructions for execution by functional units 214 in a manner that satisfies the thermal constraints of processor 212, while maintaining as high a performance characteristic as possible for the processor 212. FIG. 3 illustrates the scheduling of instructions by a thermal-aware compiler component into an example order, under some embodiments. Diagram 300 of FIG. 3 illustrates an eight functional-unit VLIW architecture 302 in which each functional unit independently executes a respective single instruction at any one time. As shown in present systems as exemplified in FIG. 1, the compiler tries to pack eight instructions together in a single instruction-word to run simultaneously in a single clock cycle and fully utilize eight functional units per clock cycle, and such an operation may unduly stress the processor if run too long. In contrast to present systems and to address specific thermal constraints, the thermal-aware component 406 of compiler 404 intentionally splits the eight instructions into multiple sets of instructions with idle instructions (no operation instructions) interspersed to prevent excessive power consumption by the functional units. The example of FIG. 3 illustrates an embodiment in which the compiler packs the instructions as two sets of four instructions plus four NOP (no operation) instructions in a first instruction word 306 and another four instructions plus four NOP instruction in a second instruction word 304 so that all eight instructions are completed in two clock cycles with each cycle executing only four real instructions, rather than eight real instructions executed in one clock cycle (as shown in FIG. 1). As FIG. 3, because of the insertion of NOP instructions, half of the functional units stay idle and therefore dynamic power is reduced by 50%, resulting in lower temperature during operation of the processor.

In some embodiments, the NOP operations may be explicitly created and added to appropriate locations of an instruction word by the scheduling component 206. In many cases, however, a number of NOP instructions may be present in the source code 202 as originally written. Such NOPs are usually included due to resource constraints, such as to delay the processor to allow other functions (e.g., input/output) to catch up. In this case, the scheduling component 206 may shuffle existing NOP instruction into the instruction words as needed based on the thermal impact of the instructions. Thus, NOPs that may be present for resource constraint issues are reconfigured to address thermal constraint issues. Alternatively, a mix of NOP shuffling and creation may be used by the scheduling component 206 to pack the appropriate instruction words.

FIG. 3 illustrates one example of instruction scheduling and packing for a particular iteration of the thermal-aware compiler component, and it should be understood that many other instruction word configurations are also possible depending on the constraints and requirements of the processing system. For example, for an eight-functional unit process, the instruction/NOP words can be interleaved so that a NOP is executed using every other functional unit in two cycles (i.e., Instruction 1/NOP/Instruction 2/NOP, Instruction 3/NOP, Instruction 4/NOP, etc.). Alternatively, three cycles could be used in which two of the instruction words have three real instructions and five NOPs and the third instruction word has two real instructions and six NOPs. Similarly, four cycles could be used in which each instruction word has two real instructions and six NOPs. Many other configurations are also possible.

For the embodiment of FIG. 3, instruction scheduling and packing using the thermal-aware component is done by the compiler 404 during compile-time and not at run-time, and thus can be considered a static versus dynamic process. In this case, a thermal estimation method is needed to facilitate the compiler to get an estimation of the device temperature. In some embodiments, a thermal modeling tool or program is used to derive an estimation of the device temperature profile using the device's physical layout and power consumption of the functional units. One example of such a thermal modeling tool is the HotSpot program, which can be used to guide the compiler to maximize the utilization of the functional units under a specific thermal constraint.

In some embodiments, the instruction scheduling can be done to achieve a certain load balancing characteristic, as shown in the FIG. 3, where in the first cycle FU1-4 are used and in the second cycle FU5-8 are used. In another one embodiment of the invention, the instruction scheduling can be done to schedule all instructions to use FU1-4 and not to use the FU5-8 for a longer period of time. In some embodiments, for functional units that are scheduled with NOP operations, each NOP functional unit is powered-off so that both dynamic power and leakage power can be eliminated. Alternatively each NOP functional unit can be set to an idle state with the NOP instruction, so that only the dynamic power is eliminated, but the functional unit remains in a semi-active state.

In some embodiments, the target processor 212 is configured to shut down the critical part or parts of the target processor that consumes the most power. As shown in FIG. 2, a control switch 216 in the VLIW pipeline is coupled to the functional units and is configured to smoothly shut down or activate/de-activate the execution logic by detecting the input instructions. In general, the VLIW processor pipeline usually contains instruction fetch, instruction dispatch, instruction decoding and execution units. The instruction fetch and dispatch units are typically shared between all functional units so that they cannot be shut down, but the instruction decoding and execution units belong to different functional units so that they can be shut down if the functional unit is not currently in use. In a usual case, the shared stage takes very few cycles while the rest takes most of the pipeline latency and consumes the most power. In some embodiments, the counter 218 and control switch 216 components are added to a VLIW pipeline to control the functional units 214. In some alternative embodiments, the compiler-driven method provided by scheduling component 206 requires no modification of hardware if the processor device or HSA system contains resident control mechanisms.

As shown in FIG. 3, the thermal-aware scheduling component implements a NOP-based mechanism to shut down the execution logic in order to remove the functional units that consume the most power. In an embodiment, a counter circuit 218 is added to the instruction decoding unit of processor 204. The counter keeps track of the continuous NOP instructions it receives. If the number exceeds a defined threshold (N), the control switch 216 is used to shut down the execution logic in the specific functional unit. When the next instruction is a real instruction (i.e., any instruction except a NOP), the counter is cleared and the execution logic will be immediately re-activated. In general, there is little or no latency associated with simply turning off and on the execution logic.

Figure 4:
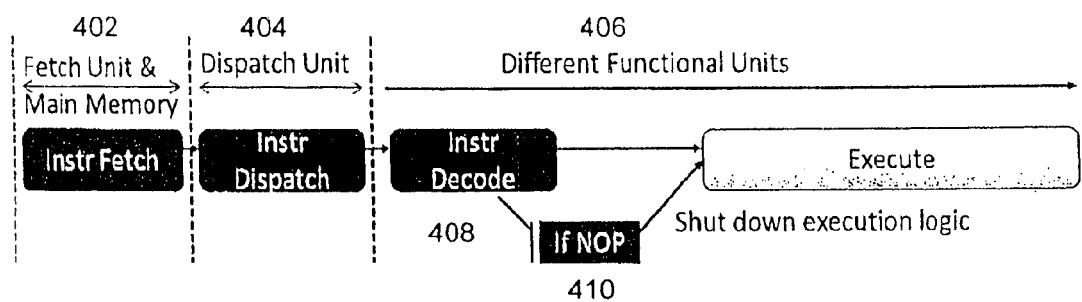
FIG. 4 illustrates the use of a NOP-based mechanism by a thermal-aware compiler component, under some embodiments.

FIG. 4 illustrates the use of a NOP-based mechanism by a thermal-aware compiler component, under an embodiment. As shown in FIG. 4, a VLIW pipeline 400 comprises a fetch unit 402, a dispatch unit 404, a plurality of different functional units 406. The fetch unit 402 performs instruction fetches, the dispatch unit 404 dispatches the instructions to the functional units 406, which then execute the fetched instructions. For the embodiment of FIG. 4, an instruction decode function 408 determines whether or not any NOP instructions 410 are present in the dispatched instructions. A counter may be used to detect the presence of consecutive NOP instructions and trigger a shutdown of the execution logic if a threshold number of NOPs is detected.

Figure 5:
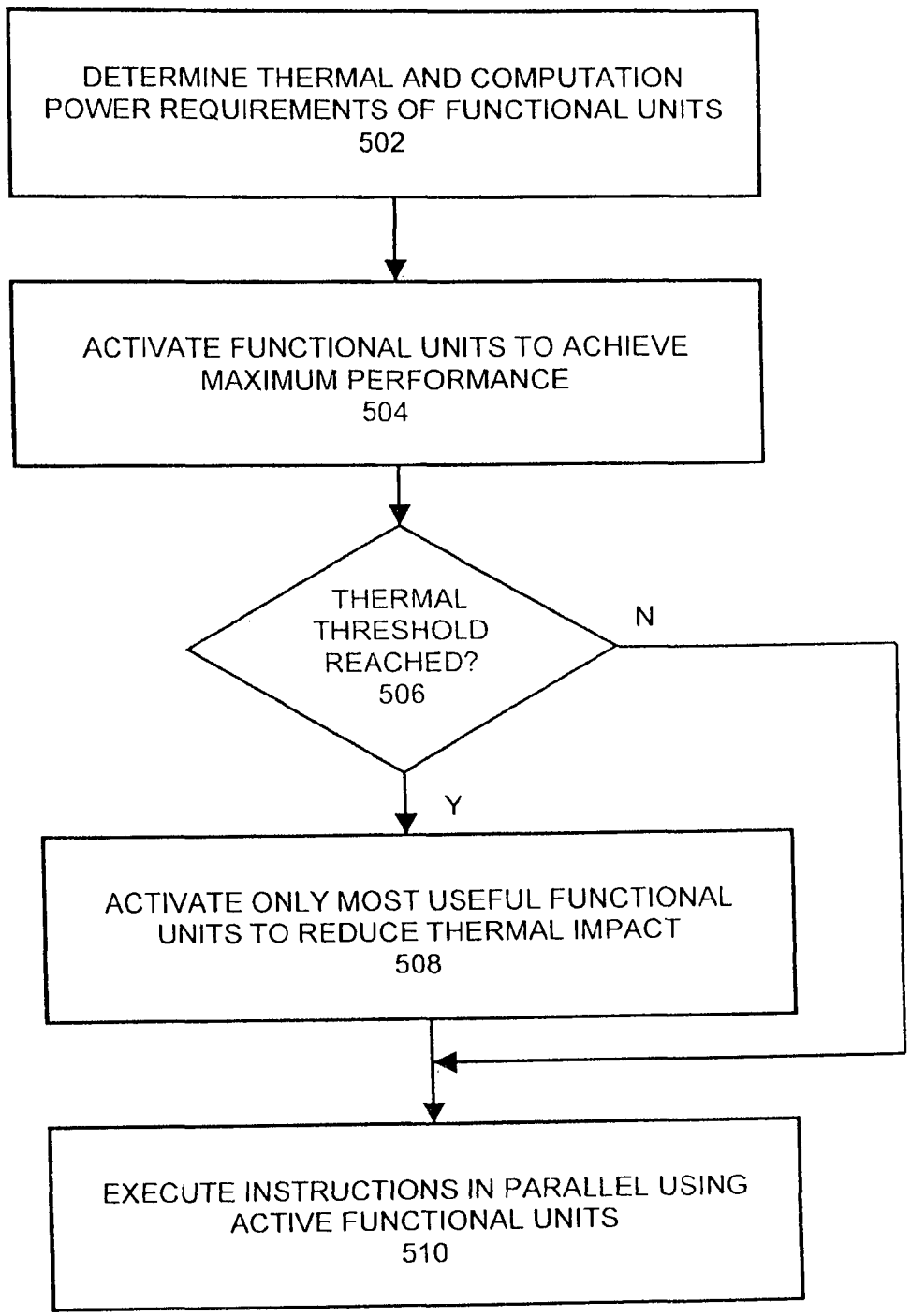
FIG. 5 is a flowchart that illustrates a method of implementing thermal-aware compilation of instruction code, under some embodiments.

The thermal-aware compiler component 206 enables a thermal/performance aware resource allocation mode in the context of VLIW processor. FIG. 5 is a flowchart that illustrates a method of implementing thermal-aware compilation of instruction code, under some embodiments. As shown in process 500 of FIG. 5, the system determines the thermal and the computation power requirements for different functional units or computing stages of the processor, act 502. This may be done using either on-chip thermal sensors or thermal modeling techniques, or a combination of devices and models. The compiler dynamically allocates different functional units to achieve maximum performance based on the system constraints and requirements. In some cases, all functional units may be active at any one time if the thermal constraints are not met or exceeded. Thus, for maximum performance, all or as many functional units as possible will be active unless a non-intensive computation requiring fewer computation units is involved. As shown in process 500, the system determines whether or not the defined thermal threshold is reached, act 506. When the thermal constraint is reached as defined by the thermal threshold value, the system activates only the most useful functional units needed to optimize performance under the thermal and power consumption limitations, act 508. This may be performed by deactivating certain functional units and/or activating certain functional units over two or more clock cycles, so that different functional units are allocated during different computing stages, as shown in FIG. 3. The instructions are then executed using the active functional units, act 510.

With the algorithm analysis of different phases, there is an optimal combination of the functional units giving the thermal constraints. Applying a NOP-based technique, such as shown in FIG. 3, creates a smooth transition between resource allocations to reduce both the static and dynamic power for the deactivated functional units.

In general, most VLIW processors are targeted at specific applications, such as digital signal processing (DSP) applications. These applications exhibit strong streaming characteristics with computations executed in a phase style. Examples of such processing include intra-prediction/inter-prediction, quantization/dequantization, and DCT/IDCT operations in video encoders, among others. Different phases implicate different algorithms and have different computing power requirements. For computing intensive phases (i.e., high ILP) it is usually necessary to utilize all the functional units of the processor core to maintain a certain minimum performance. While for non-intensive phases, (i.e., low ILP), it is power-inefficient to keep all the functional units activated. Traditional VLIW designs do not adequately address how to save power in those scenarios, which is becoming an important issue as power consumption and heat build-up become greater concerns in modern processor design.

Figure 6:
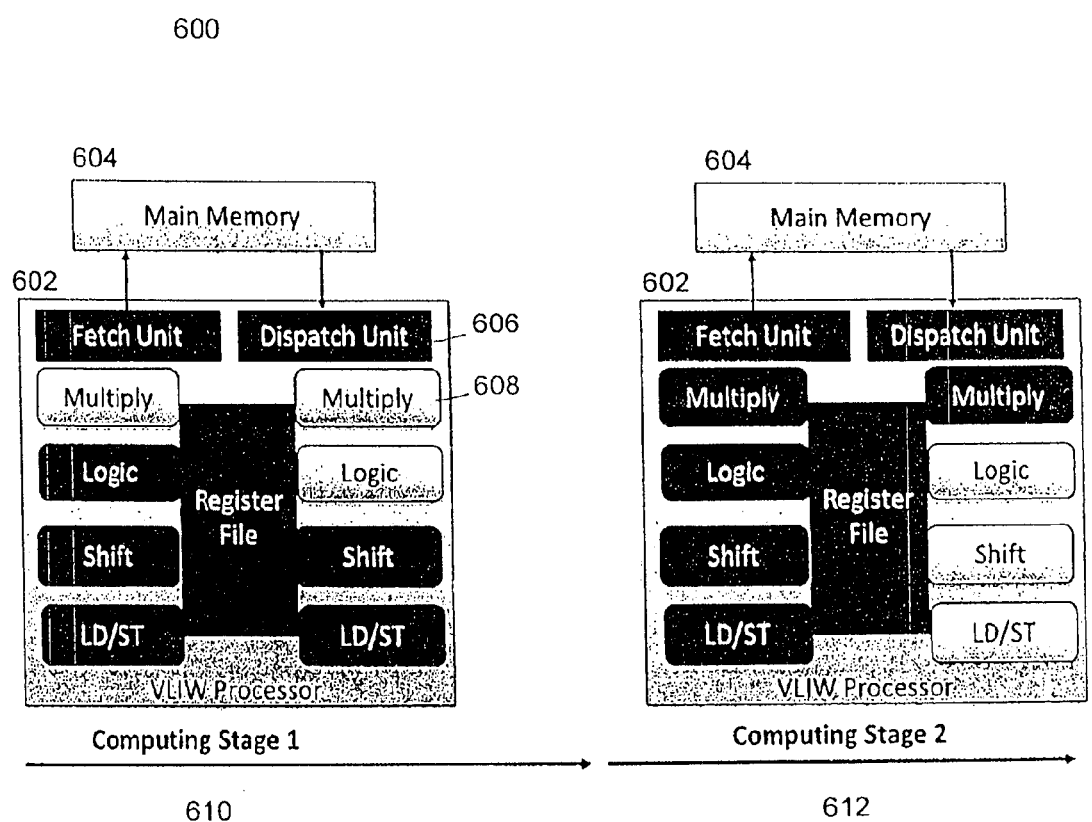
FIG. 6 illustrates the activation of different functional units during different computing stages, under some embodiments.

FIG. 6 illustrates the allocation of different functional units during different computing stages, under some embodiments. Diagram 600 of FIG. 6 illustrates a VLIW processor 602 coupled to main memory 604 and comprising a number of functional units, such as a fetch unit, a dispatch unit, multipliers, logic, shift registers, and so on. A first computing stage, denoted 'Computing Stage 1' 610 illustrates an instance of the processor 602 when executing a first instruction word, and a second computing stage, denoted 'Computing Stage 2' 612 illustrates an instance of the processor 602 when executing a second instruction word. During the first computing stage 610 a number of functional units 608 are active as denoted by black block elements, and the remaining functional units 606 are de-activated as denoted by white block elements. Some units, such as fetch units, dispatch units, and register files may not be able to be completely shutdown during operation of the processor (and are thus shown as black units). During execution of the second instruction word, a different set of functional units are activated and deactivated. Thus, as shown in FIG. 6, during computing stage 1, the multipliers and one logic circuit are de-activated, and during computing stage 2, the multipliers are activated and a shift register and LD/ST component are de-activated. FIG. 6 is intended to be an example of a VLIW processor architecture and operation of the processor during execution of instruction words scheduled using a thermal-aware scheduler component under some embodiments. Many other examples are also possible.

Embodiments are thus directed to a power consumption and thermal reduction technique for VLIW processors that can be done at compile time, compared to the computational sprinting approach, which is a run-time solution. The present solution does not add the hardware overhead of thermal sensor and extra hardware for task migration among processor cores. In addition, the thermal-aware compilation method improves instruction execution granularity in that it does not shutdown the entire processor core, but only certain functional units. In general, such embodiments are significantly different from present dynamic solutions that are applied at run-time, but can be used with these systems to complement present mechanisms to achieve better results with regard to preventing exceeding thermal constraints when executing instructions in parallel in a VLIW processor. Embodiments thus encompass a performance/thermal-aware resource allocation to achieve maximize the utilization of functional units while meeting the thermal constraints of the processor. It thus maximizes the overall benefits of performance-thermal co-design with the combination of static plus dynamic solutions and the combination of core-level plus functional unit-level optimization.

For purposes of the present description, the terms "component," "unit," "module," "circuit," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Under some embodiments, the computer readable media may store program code or software instructions that are executed by a computer system and cause the computer system to perform at least some of the functions and processes of a method as shown in FIG. 5.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. The detailed description is thus intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for compiling instruction code for execution in a processor having a plurality of computing stages, each having a plurality of functional units, comprising:
    determining a thermal constraint of the computing stages of the processor; and
    scheduling in the compiled instruction code real instructions to be executed in parallel by first functional units of a first computing stage by a first very long instruction word (VLIW), and second functional units of a second computing stage by a second VLIW, wherein the first functional units are different from the second functional units, and further wherein the scheduling is configured to prevent exceeding the thermal constraint during execution of the instruction code;
    inserting a first set of no operation (NOP) instructions with the real instructions executed by the first functional units and second set of NOP instructions with the real instructions executed by the second functional units to create interleaved NOP instructions between two consecutive instruction words; and
    counting continuous NOP instructions of the first and second set of NOP instructions; determining if a number of continuous NOP instructions exceeds a threshold and if so, shutting down one of the first functional unit or second functional unit and clearing the counter upon receipt of a next real instruction.

2. The method of claim 1 wherein a number of the continuous NOP instructions executed over a number of consecutive clock cycles is configured to prevent exceeding the thermal constraint during execution of the instruction code.

3. The method of claim 1 wherein the thermal constraint of the processor is based on power consumption characteristics of the functional units.

4. The method of claim 3 wherein the thermal constraint is determined by a thermal model of the processor and the plurality of functional units.

5. The method of claim 1 wherein the instruction words comprise a plurality of instruction words, and wherein each instruction word of the plurality of instructions words contains at least one real instruction followed by a number of NOP instructions each sent to a respective functional unit of the plurality of functional units.

6. The method of claim 5 wherein the plurality of instruction words each includes substantially an equal number of real instructions.

7. The method of claim 6 wherein the first functional and second functional units are selected from the group consisting of: fetch units, dispatch units, register files, multiplexers, shift registers, and logic circuits.

8. The method of claim 3 further comprising:
    determining a relative importance of each functional unit of the plurality of functional units;
    determining if a threshold limit defining the thermal constraint is reached during activation of the functional units; and
    de-activating functional units in order of relative importance to maximize performance of the processor.

9. The method of claim 8 wherein determining if the threshold limit is reached is performed at least in part by a thermal sensor device coupled to the processor.

10. A method of allocating resources in a processor having a plurality of computing stages, each having a plurality of functional units when executing instruction code, the method comprising:
    defining a relative importance of each functional unit of the plurality of functional units of each computing stage of the plurality of computing stages;
    determining a thermal constraint of the computing stages of the processor;
    defining a plurality of instruction words each containing real instructions and no operation (NOP) instructions to be simultaneously executed during a single respective clock cycle by first functional units of a first computing stage by a first very long instruction word (VLIW), and second functional units of a second computing stage by a second VLIW, wherein the first functional units are different from the second functional units, and wherein the real instructions activate a respective functional unit;
    inserting a first set of no operation (NOP) instructions with the real instructions executed by the first functional units and second set of NOP instructions with the real instructions executed by the second functional units to create interleaved NOP instructions between two consecutive instruction words;
    counting continuous NOP instructions of the first and second set of NOP instructions; determining if a number of continuous NOP instructions exceeds a threshold and if so, shutting down one of the first functional unit or second functional unit and clearing the counter upon receipt of a next real instruction;
    determining if a threshold limit defining the thermal constraint is reached during activation of the functional units; and
    de-activating functional units in order of relative importance to maximize performance of the processor.

11. The method of claim 10 wherein the thermal constraint of the processor is based on power consumption characteristics of the functional units, and wherein the first functional and second functional units are selected from the group consisting of: fetch units, dispatch units, register files, multiplexers, shift registers, and logic circuits.

12. The method of claim 11 wherein the thermal constraint is determined by at least one of a thermal model of the processor and the plurality of functional units, and a thermal sensor device coupled to the processor.

13. The method of claim 12 further comprising scheduling a number of NOP instructions executed over a number of consecutive clock cycles to prevent exceeding the thermal constraint during execution of the instruction code.

14. An apparatus comprising:
    a processor executing a hardware modeling component executing program code configured to determine a thermal constraint of a processor having a plurality of computing stages, each having a plurality of functional units configured to simultaneously execute during a single clock cycle, instructions packed in an instruction word; and a hardware compiler component executing program code configured to define a plurality of instruction words each comprising both real instructions and one or more no operation (NOP) instructions to be executed in parallel by first functional units of a first computing stage by a first very long instruction word (VLIW), and second functional units of a second computing stage by a second VLIW, wherein the first functional units are different from the second functional units, wherein a number of NOP instructions executed over a number of consecutive clock cycles is configured to prevent exceeding the thermal constraint during execution of the instruction code, and inserting a first set of no operation NOP instructions with the real instructions executed by the first functional units and second set of NOP instructions with the real instructions executed by the second functional units to create interleaved NOP instructions between two consecutive instruction words; and a counter counting continuous NOP instructions of the first and second set of NOP instructions; determining if a number of continuous NOP instructions exceeds a threshold and if so, shutting down one of the first functional unit or second functional unit and clearing the counter upon receipt of a next real instruction.

15. The apparatus of claim 14 wherein the program code executed by the hardware compiler component is configured to determine a relative importance of each functional unit of the plurality of functional units; determine if a threshold limit defining the thermal constraint is reached during activation of the functional units; and de-activate functional units in order of relative importance to maximize performance of the processor.

16. The apparatus of claim 15 further comprising a thermal sensor device coupled to the processor to at least partially determine if the threshold limit is reached.

17. The apparatus of claim 14 wherein the plurality of instruction words each includes substantially an equal number of real instructions.

18. The apparatus of claim of claim 14 wherein the functional units are selected from the group consisting of: fetch units, dispatch units, multipliers, logic circuits, shift register, and register files.

* * * * *